Jan. 12, 1932. T. J. TOPPER 1,840,985
AUTOMATIC COFFEE URN
Filed Nov. 19, 1929
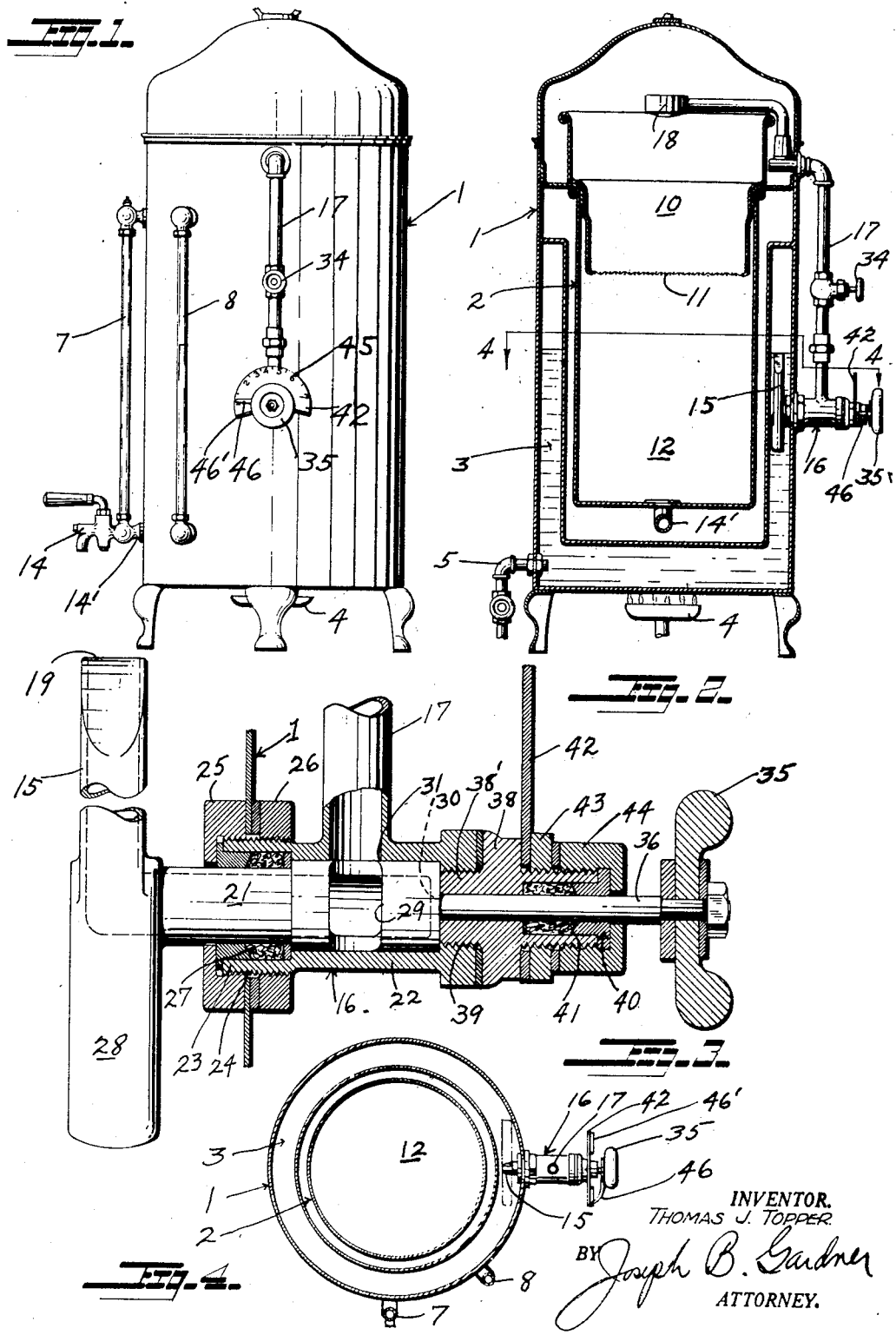
INVENTOR.
THOMAS J. TOPPER
BY Joseph B. Gardner
ATTORNEY.

Patented Jan. 12, 1932

1,840,985

UNITED STATES PATENT OFFICE

THOMAS J. TOPPER, OF SAN FRANCISCO, CALIFORNIA

AUTOMATIC COFFEE URN

Application filed November 19, 1929. Serial No. 408,277.

The invention relates to improvements in coffee urns, particularly the commercial type in which the water heating and coffee brewing chamber are operatively connected.

With urns of the type to which this invention relates it has been the practice to manually open a feed valve to permit water to feed from the heating chamber to the brewing chamber and to shut off the valve when a water gage indicates the desired amount of water has thus been fed. Such an operation requires that considerable skill and close attention of the operator be exercised to insure the feeding of the proper amount of water. The operator must stand with his hand on the valve, watching the gage, for from five to ten minutes or more, ready to shut off the valve immediately the gage indicates the proper feed has taken place. Should the operator become distracted or otherwise become inattentive to the operation, an over feeding might and often does occur with the result that not only is the coffee brew spoiled but, due to the overflowing of the urn, an objectionally sloppy condition in and around the urn is created.

An object of this invention is to provide a coffee urn of the approved and present day popular type which will eliminate in a particularly efficient manner the objections heretofore encountered in the operation of such urns, by the provision for automatically stopping the water feed to the brewing chamber when the desired and predetermined amount of water has been fed to said chamber.

Another object is to provide a coffee urn of the character described in which by a single, easily effected movement of an operating member the operator may set the urn to cause the entire contents of water in the heating chamber, or any predetermined amount less than the full amount, to be automatically delivered to the heating chamber in such manner that after such setting operation the operator's attention to the urn is no longer required, whereby the operator is free to attend to other duties.

A further object is to provide for the automatic water feed in the manner hereinbefore described, with a means of simple and expensive construction which causes the water to be elevated from the water heating chamber to the brewing chamber whereby the desirable and approved superimposed relation of the brewing chamber to the water heating chamber in the urn structure need not be changed.

Still another object is to provide in a coffee urn of the character described an automatic measuring and water feeding means wherein an adjustable intake pipe located within the water heating chamber and piping extending into said chamber from the brewing chamber are connected by a novel and highly efficient coupling means which provides for a smooth and accurate adjustment of said pipe and prevents accumulation in and the stoppage of the feed line to the brewing chamber.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings,

Figure 1 is a front elevation of a coffee urn constructed in accordance with my invention.

Figure 2 is a vertical sectional view of the urn shown in Figure 1.

Figure 3 is an enlarged fragmentary sectional view of the automatic measuring means particularly showing the novel coupling device.

Figure 4 is a cross-sectional view taken on the plane of line 4—4 of Figure 2.

The present embodiment of my invention, as shown in detail in the accompanying drawings, comprises a coffee urn of a popular type wherin there is provided in a comparatively narrow, upright cylindrical casing 1 a coffee brewing chamber 2, the lower part of which is surrounded by a generally annular water heating chamber 3. A burner 4 is arranged to heat the water in said chamber. Water from a suitable source, not shown, is fed to the heating chamber by piping 5 having a valve 6 therein. Water and coffee gages 7 and 8 are provided in the usual manner for the respective water heating and brewing chambers. It will be noted that the brewing chamber 2 has a coffee grounds container 10 at its upper end whereby when hot water is elevated by steam pressure, from the water heating chamber 3, and discharged into said container 10, the brew will drip through the perforate bottom 11 of said container into the coffee containing portion 12 of the brewing chamber, said portion being known as the "crock". Coffee may be drawn off in the usual manner through a faucet 14 which is connected by piping 14' with the crock 12.

Means is provided for elevating the water from the water chamber 3 and causing measured quantities thereof to be discharged into the upper part of the brewing chamber. Such means is preferably so arranged that it may be manually set to deliver substantially the entire contents of the water chamber or any predetermined lesser amount. This arrangement is such that the operator, say desiring to make five gallons of coffee, after having placed the proper amount of coffee in the container 10 therefor, by a simple and easily effected movement of an operating member sets the urn apparatus to cause just that amount of water to be delivered to the brewing chamber. To effect this delivery a valve is opened, but said valve need not be closed at the moment that the gage indicates such an amount of water has been fed, as was the case heretofore, for with the means of this invention the water feed automatically ceases when the predetermined amount has fed to the brewing chamber. Therefore, but a moment's attention of the operator is required to bring about the accurate feeding of the water to the urn and not only are over feeding and spoiling of the brew, and overflowing of the urn prevented, but the operator is free to perform other duties, whereas heretofore from 5 to 10 or more minutes of the operator's time was taken up with each brewing of water. At any convenient time after a feeding operation, in accordance with this invention, the operator may close the feed valve. Such closing is not entirely necessary except that the steam in the heating chamber will escape therefrom when the valve is open, as will be later described, yet on closing the valve the steam pressure will immediately build up sufficient to force the water feed.

As here shown, this automatic, measuring, water feeding means comprises an intake pipe 15 mounted for movement on a horizontal axis within the annular part of the water chamber 3 and connected by a coupling means 16 with piping 17 which terminates in a nozzle 18 for directing the water downwardly into the coffee grounds container 10. The pipe 16 has a narrow slot like open free end 19 which is disposable when the pipe is adjusted, into different planes with respect to the level of the water in the chamber 3. It will then be seen that when a given or known amount of water is contained in the chamber 3, upon adjusting said pipe to dispose said end thereof in different positions relative to said level, say, through approximately 180° of arc, that different amounts of water as desired may be caused to pass out through said pipe. In the present instance I utilize the pressure of the steam which is generated in heating the water, to force the water out through this intake pipe and elevate it to the brewing chamber. It may here be noted that by reason of the narrow opening 19 the escape of steam through the intake pipe when the water drains to the level of said opening is minimized and furthermore measuring of the water to a greater nicety is provided for by such an opening.

Adjustment of the intake pipe 15 is effected through the coupling means 16, which with the adjusting means will now be described. The inner end of the pipe 15 is suitably coupled with one end of a rotatable tubular conduit 21 journaled in a bearing sleeve 22. This sleeve has an externally threaded inner end 23 extended through an opening 24 in the casing 1 in such manner that nuts 25 and 26 may be turned thereon to securely attach the sleeve in place. The tubular conduit 21 extends inwardly beyond said end of the sleeve through a stuffing box provided by packing 27 and the nut 25. At the juncture of said conduit 21 with the intake pipe 15 is a counterweight member 28 disposed as downward extension of said pipe, said counterweight acting to normally hold the pipe 15 in inoperative position, that is, with the end 19 of said pipe at the point of its greatest possible elevation in the chamber 3. The water entering the conduit 21 discharges through a large outlet opening 29 in one side of the pipe, the adjacent end of the pipe being closed by the wall 30. The piping 17 is connected with said sleeve 22 in such manner as to communicate through an opening 31 with the opening 29. Owing to the relatively great size of the outlet opening 29 compared to the opening 31 said openings will remain in registration and communication with one another throughout rotation of the conduit member 21 through approximately 180° of arc, which rotation is necessary to dispose the open end 19 of the pipe 15 at its highest and lowest points. Thus throughout the range of adjustment of the pipe 15 the coupling means maintains communication of the pipe 15 with the hot water feed piping 17 leading to the brewing chamber. It will be noted that the size, shape and arrangement of the large opening 29 also prevents accumulations or alkaline or other encrustations from forming and stopping the line. Piping 17 is controlled by a valve 34 connected in a section of said piping and which is opened by hand after setting the pipe 15 to a predetermined position, said valve being closed at any convenient time after the feeding operation inasmuch as the cessation of water feed is not dependent upon closing said valve.

A hand wheel 35 carried on a shaft 36 which is fixed to the closed end of the conduit 21 provides for readily turning said conduit and thereby disposing the end 19 of the pipe 15 at different levels necessary to cause different predetermined amounts of water to be fed to the brewing vessel. A bearing member 38 for the shaft 36 has a threaded reduced inner end 38' screwed into a threaded opening 39 at one end of the sleeve 22, there being a suitable stuffing box 40 provided on a reduced outer end 41 of said bearing. Furthermore the bearing 38 serves as a means for supporting a dial 42 held thereon by the nuts 43 and 44. On the face of the dial are calibrations 45 indicating gallons, said calibrations being, for example, numbered 1 to 7 from left to right. On the shaft is a pointer 46 arranged to move over and close to the calibrated face of the dial. These parts are positioned in such manner that when the pointer is disposed opposite one of the calibrations of the dial, the open end 19 of the pipe 15 will be disposed to cause the amount of water indicated by the pointer and dial to be fed to the brewing chamber. Thus it will be seen that any predetermined amount of water under and up to the full content of the water chamber may be readily and easily fed to the brewing vessel, through the simple expedient of turning the hand wheel until the pointer comes to the mark on the dial indicating the amount of water desired, and then merely opening the valve 34. Stops 46' on the dial limit the movement of the pointer and shaft 36.

It will now be clear that the urn of this invention may be operated in a particularly efficient manner to provide the objects and advantages hereinbefore described.

I claim:

1. A liquid intake pipe having an intake end arranged to be disposed at different levels in a body of liquid, another pipe, an angular rotatable extension of said intake pipe having an elongated arcuate side opening of greater length than the diameter of the extension and arranged to register with one end of the second pipe, a coupling sleeve rotatably joining said extension and the second pipe, means for rotating the extension, and a counterbalancing extension depending from said intake pipe at the juncture thereof with said extension.

2. A liquid intake pipe having an intake end arranged to be disposed at different levels in a body of liquid, another pipe, a rotatable extension of said intake pipe having a side opening of greater width than the diameter of the extension and arranged to register with one end of the second named pipe, a coupling sleeve joining said extension and the second named pipe, a rotatable handle member fixed to said extension, a counterbalancing means carried by said intake pipe and arranged to normally hold the same upright.

In testimony whereof, I have hereunto set my hand at Oakland, California, this 9th day of November, 1929.

THOMAS J. TOPPER.